(12) United States Patent
Abendschein

(10) Patent No.: US 6,491,445 B1
(45) Date of Patent: Dec. 10, 2002

(54) CRIMP PLUG FOR A CONNECTOR

(75) Inventor: Frederic Henry Abendschein, Columbia, PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/456,871

(22) Filed: Dec. 8, 1999

(51) Int. Cl.$^7$ ................................................. G02B 6/36
(52) U.S. Cl. .............................. 385/87; 385/86; 385/76
(58) Field of Search .............................. 385/87, 86, 76, 385/69, 56, 139, 71; 439/456, 457, 458, 459, 460, 461, 465, 587, 589, 597, 598, 599, 600, 610

(56) References Cited

U.S. PATENT DOCUMENTS

| | | | | |
|---|---|---|---|---|
| 4,339,171 A | * | 7/1982 | Makuch et al. ................ | 385/87 |
| 4,795,229 A | * | 1/1989 | Abendschein et al. ........ | 385/87 |
| 5,140,662 A | * | 8/1992 | Kumar ........................ | 385/87 |
| 5,231,685 A | * | 7/1993 | Hanzawa et al. ............. | 385/87 |
| 5,337,385 A | * | 8/1994 | Baderschneider et al. ..... | 385/87 |
| 5,418,874 A | * | 5/1995 | Carlisle et al. ................ | 385/87 |
| 5,450,514 A | * | 9/1995 | Hotea et al. ................... | 385/87 |
| 5,455,880 A | * | 10/1995 | Reid et al. ..................... | 385/86 |
| 5,732,175 A | * | 3/1998 | Fan ............................... | 385/66 |
| 5,915,057 A | * | 6/1999 | Weigel .......................... | 385/76 |
| 6,130,978 A | * | 10/2000 | Limbert et al. ................ | 385/87 |

* cited by examiner

Primary Examiner—Cassandra Spyrou
Assistant Examiner—John Juba, Jr.

(57) ABSTRACT

The invention is directed to a crimp plug having a front portion, a center portion, and a securing portion. A conductor receiving cavity extends from the front e into the center portion. A stop shoulder within the center portion provides transition from the conductor receiving cavity to a plurality of conductor receiving passageway extending to a rear end. Each conductor receiving passageway serves to properly position the conductors while the stop shoulder serves to control the insertion length. A securing portion extends from the center portion and provides for securing of the cable.

19 Claims, 3 Drawing Sheets

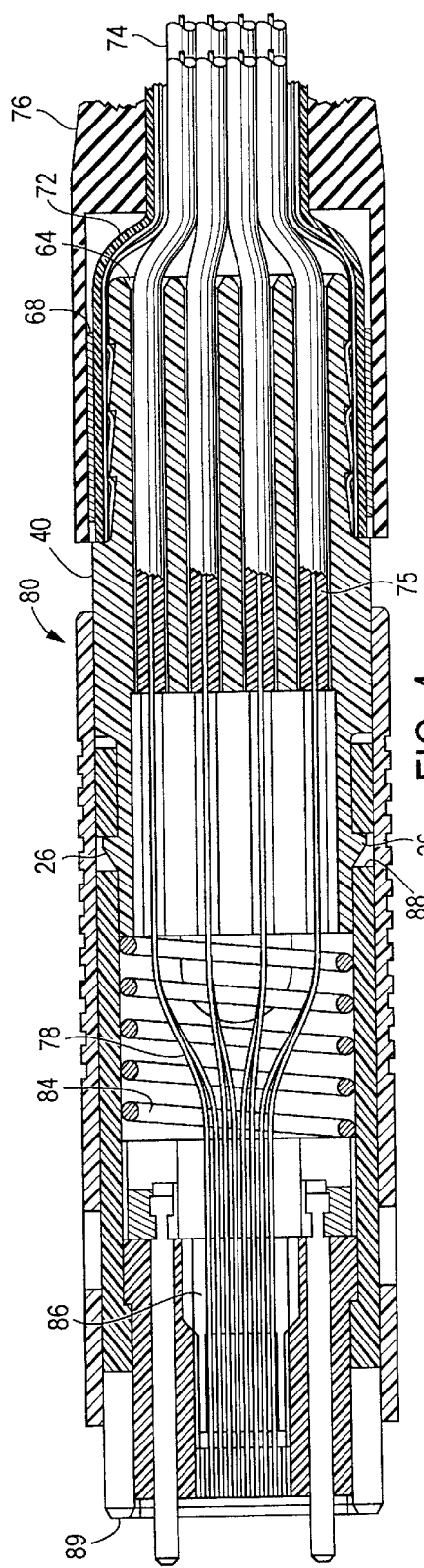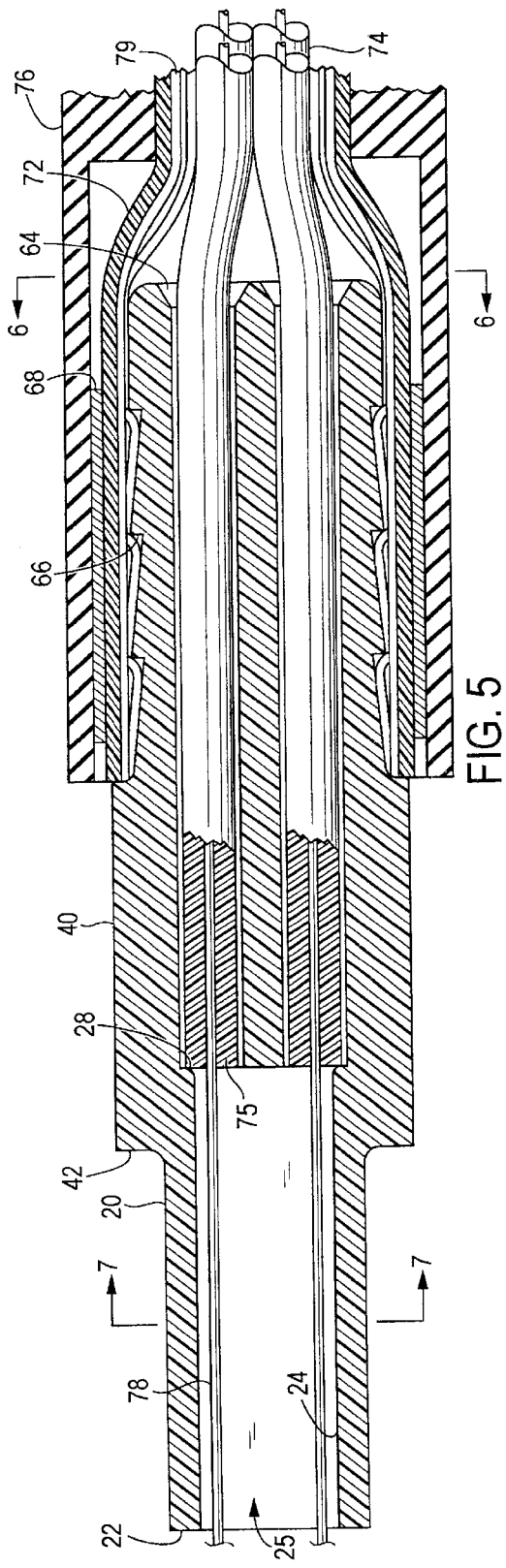

CRIMP PLUG FOR A CONNECTOR

BACKGROUND

The invention is related to fiber optic or electrical connectors. More particularly, the invention is related to a crimp plug for use in such connectors.

Connectors typically are utilized for terminating a plurality of conductors. These conductors may be either electrical wires or fiber optic light guides such as fibers. The conductors are typically arranged in a cable having an outer jacket surrounding a plurality of insulated conductors. In between the conductors and the outer jacket, other optional components of the cable include shielding, strength members, or intermediate insulated layers. In order to terminate the conductors, the outer jacket and the other optional components are typically stripped back from the individually insulated conductors. Individually insulated conductors may be utilized without an outer jacket. Each of the insulated conductors is then further stripped to expose and terminate the respective conductor to the connector. The conductors are typically inserted from a rear end of the connector. Various terminations may be utilized. For example, in electrical connectors, each wire is typically terminated to either a pin or a socket and then inserted into the connector housing. For fiber optic connectors, each individual fiber or a plurality of fibers is typically terminated to a 1-rule which is then inserted into the connector housing.

The conductors are often passed through intermediate components before entering the conductor receiving end of the housing. These intermediate components may be utilized to properly position a plurality of conductors for terminations at a mating end of the housing. One such intermediate component is known as a crimp plug. Typically, a crimp plug is positioned at the rear end of the connector housing and receives the plurality of conductors through a cavity passing from the rear end into the connector housing. An outer surface of the crimp plug receives the outer jacket of the cable and a crimp ring is compressed over the outer jacket to secure the outer jacket to the crimp plug. In the case where individually insulated conductors are used the crimp ring is not used. The stripped conductors pass through the crimp plug for termination at the mating end of the connector housing and the crimp plug is typically secured within the rear end of the connector housing.

U.S. Pat. No. 5,367,595 (Jennings et al.) discloses a fiber optic connector for joining a bundle of jacketed optical fibers to an optical device that requires a linear array or arrays of stripped optic fibers at the connection interface. Block shaped portions are provided in the connector for receiving jacketed fibers. The grooves have a transition portion so that a front portion is large enough to accommodate only stripped cores of the fibers. Complementary posts and holes are utilized for assembling block portions to each other. An inner wedge member is attached to an outer cell which encases the assembled block portions. Resilient latch fingers are provided on the back wall of the shell for retaining fibers which have been prepared as shown in FIG. 4 of that patent. Alternate embodiments are also shown wherein slots have transition sections each for receiving a jacketed fiber or a stripped core.

U.S. Pat. No. 5,915,055 (Bennett et al.) shows a method and apparatus for connectorizing fiber optic cable. The apparatus has a jumper buffer seat and a jumper insert. The jumper buffer seat features bores having tapered openings to facilitate insertion of stripped and of jumpers or fibers through the bores. a Small flats are provided along the tapered sections for allowing only stripped fibers to pass into the forward sections, of the bore. The jumper insert has a singular tapered channel for transitioning the plurality of fibers into a linear array. A completed splice is enclosed in the splice housing.

U.S. Pat. No. 4,368,948 (Despouys) teaches a fiber optic connector ferrule having a support sleeve preferably made of a deformable metal material. The support sleeve is inserted into a barrel having a passage which is large enough to only pass a stripped fiber. The fiber is fixed to the ferrut by crimping the sleeve.

While these patents show devices for limiting conductor insertion, none provide a method for terminating or securing an outer jacket. Known crimp plugs, while providing a method for securing an outer jacket, do not provide control of conductor insertion length. A problem therefore exists with such crimp plugs in that during assembly, the pre-stripped cable is manually inserted into the rear end of the crimp plug until a desired length of stripped conductors extend out of the front end. When handling a plurality of conductors, it is often difficult to achieve equal lengths of stripped conductors extending out of the front end. If some conductors are inserted farther than others, additional stresses will be applied to these conductors when a pulling force is applied to the terminated cable in a completed connector assembly.

An additional problem exists in that crimp plugs having a singular cavity for receiving a plurality of conductors present difficulty in properly arranging the conductors for termination at the mating end of the connector. Once the singular cavity is populated with conductors, the conductors must be manually arranged to be terminated in their respective positions at the mating end of the connector.

SUMMARY

It is therefore an object of the invention to provide an improved crimp plug for use in a connector wherein insertion length and positioning of the conductors are controlled.

This and other objects have been achieved by providing a crimp plug having a front portion which is insertable into the cable receiving end of a connector, a mid portion having a passageway for receiving a plurality of conductors, and a securing portion extending rearward from the mid portion. The securing portion has a plurality of conductor receiving passageways extending from a rear end into the mid portion. A stop shoulder is provided within the crimp plug to control conductor insertion length.

BRIEF DESCRIPTION OF THE DRAWINGS

The invention will now be described by way of example with reference to the accompanying figures of which:

FIG. 4 is a cross-sectional view of the assembled crimp plug and connector taken along the line 4—4 of FIG. 3.

FIG. 5 is a cross-sectional view of the crimp plug taken along the line 5—5 of FIG. 1.

DETAILED DESCRIPTION OF THE PREFERRED EMBODIMENT

Figure 1:
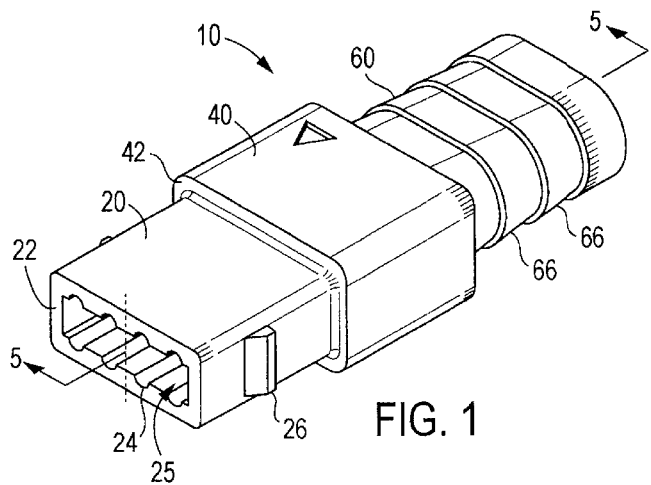
FIG. 1 is a three-dimensional front view of the crimp plug according to the present invention.
Figure 2:
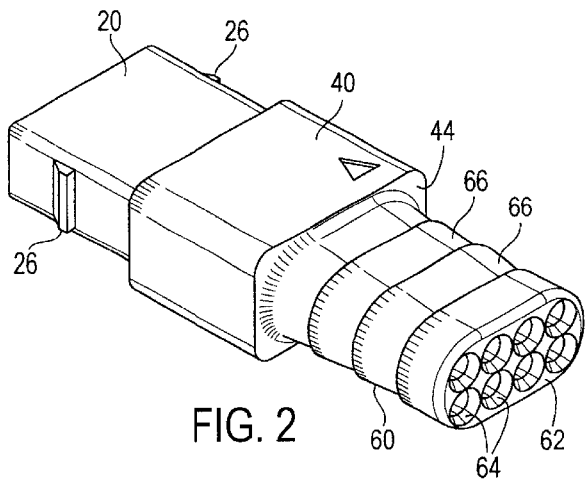
FIG. 2 is a three-dimensional rear view of the crimp plug in FIG. 1.

The crimp plug 10 of the present invention will first be described generally with reference to FIG. 1. The crimp plug has three major portions. A front portion 20 extends from a center portion 40 and securing portion 60 extends rearward from the center portion 40 opposite the front portion 20. A plurality of conductor receiving passageways 64 extend from a rear end 62 toward the center portion 40. These conductor receiving passageways 64 are in communication with semicircular passageways 24 passing through the front portion 20 to a front end 22. Securing projections 26 are provided along sides of the front portion 20 and ridges 66 are provided along the outer surface of the securing portion 60 and extend transverse to the conductor receiving passage ways 64.

Each of the major portions 20, 40, 60 will now be described in greater detail. The front portion 20 is generally how as best shown in FIGS. 1 and 5. Semicircular passageways 24 extend from the front end 22 through a conductor receiving cavity 25. A pair of securing projections 26 extend from outer surfaces of opposing side walls.

The center portion 40 is also generally hollow and has an outer dimension which is larger than the outer dimensions of the front portion 20. A front transition 42 is disposed between the front and center portions 20, 40. Similarly, a rear transition 44 is disposed between the center portion 40 and the securing portion 60. The conductor receiving cavity 25 extends from the front end 22 through the front portion 20, and into the center portion 40. Each semicircular passageway 24 ends at a stop shoulder 28 disposed within the center portion 40. Likewise, the conductor receiving cavity 25 ends at the stop shoulder 28. A plurality of conductor receiving passageways 64 extends from the stop shoulder 28 to the rear end 62. Each conductor receiving passageway 64 is generally circular and dimension to receive an insulated conductor. It should be understood by those reasonably skilled in the art that the conductor receiving passageways 64 should be shaped and dimensioned to receive a desired conductor 74. In this embodiment, the conductors are shown as optical fibers 78 having generally circular cross sections surrounded by circular insulators known as buffers. It should also be understood that the conductors 74 may be electrical, may have several layers surrounding each conductor, and may have different cross sections.

The securing portion 60 begins at the rear transition 44 and extends to the rear end 62. The securing portion 60 is dimensioned to be slightly smaller than the center portion 40. The rear transition 44 is disposed between the center portion 40 and the securing portion 60. The securing portion 60 is generally oval in cross-section, however, it may take other shapes as appropriate to secure the desired cable 70 as will be described below. Along the outer surface, a plurality of ridges 66 extend in a direction transverse to the conductor receiving passageways 64. Each conductor receiving passageway 64 extends from within the center portion 40 through the securing portion 60. It should be understood by those reasonably skilled in the art that while the stop shoulder 28 is shown within the center portion 40 at a desired location, this stop shoulder 28 and transition between the conductor receiving passageways 64 and the semicircular passageways 24 may be moved along the conductor receiving cavity 25 as desired.

Figure 3:
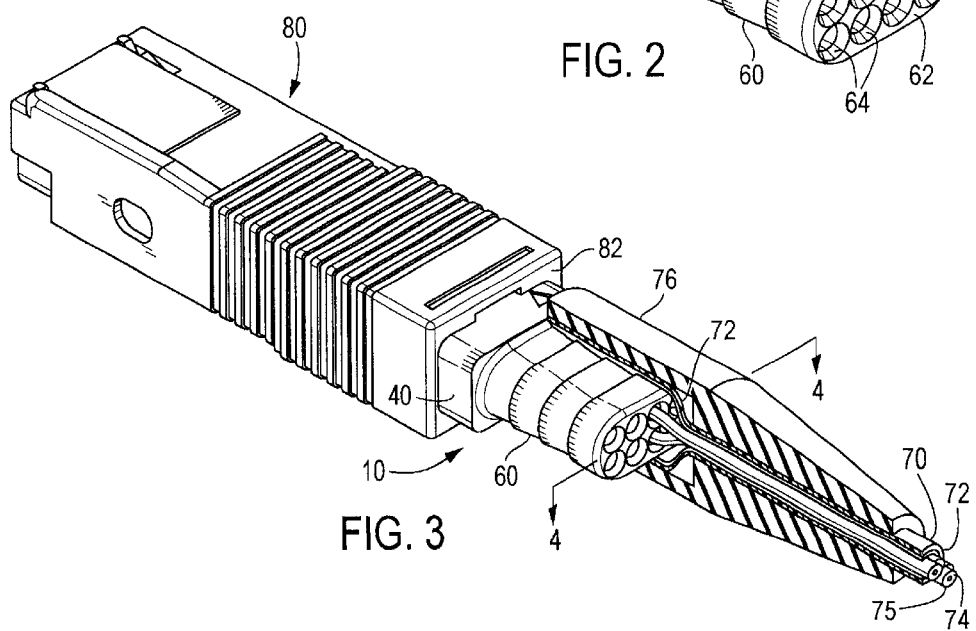
FIG. 3 is a three-dimensional rear view showing the crimp plug FIG. 2 assembled into a connector.
Figure 6:
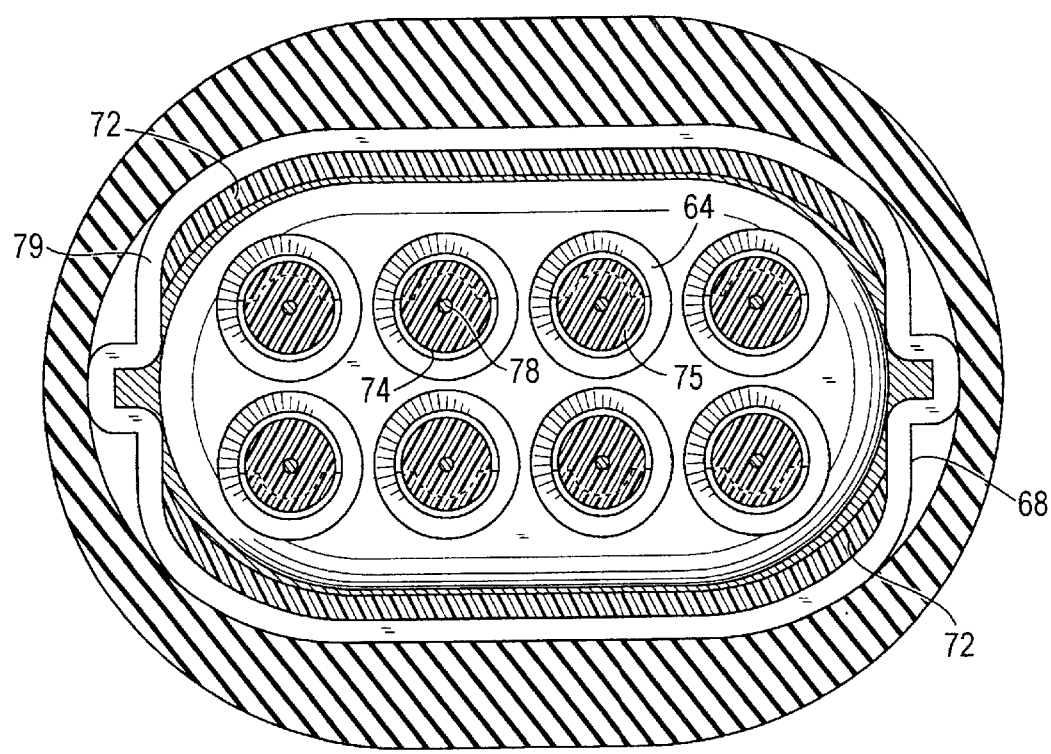
FIG. 6 is a cross-sectional view of the crimp plug taken along the line 6—6 of FIG. 5.
Figure 7:
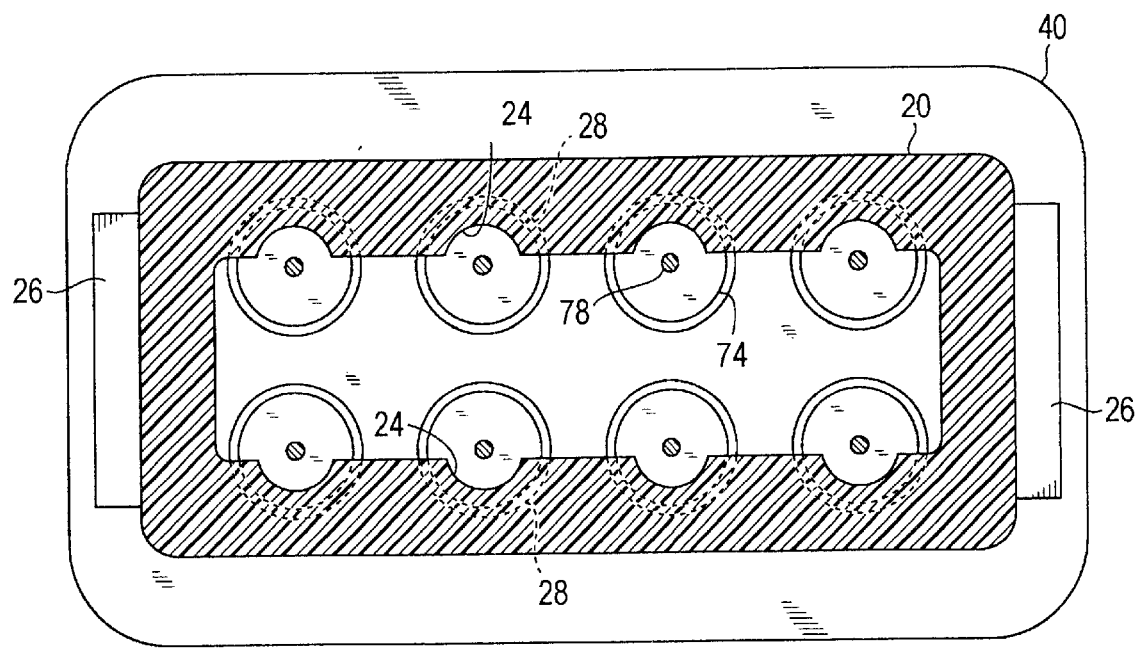
FIG. 7 is a cross-sectional view of the crimp plug taken along the line 7—7 of FIG. 5.

Installation of a cable 70 into the crimp plug 10 will now be described in greater detail with reference to FIGS. 3,5,6 and 7. The cable 70 is first stripped to remove a portion of the outer jacket 70 thus exposing a length of conductors 74. Each conductor is further stripped to remove a portion of a buffer 75 and then inserted into respective conductor receiving passageway 64 from the rear end 62 as best shown in FIG. 3. The conductors 74 are finally positioned within respective conductor receiving passageways 64 so that each buffer 75 abuts stop shoulder 28 as shown in FIGS. 5 and 7. The individual conductors 78 or fibers pass through the conductor receiving cavity 25, and out of the front end 22. The outer jacket 72 is disposed over the securing portion 60. It should be noted that in FIG. 5, intermediate layers 79 are also placed over the securing portion 60 underneath the outer jacket 72. In the case of a fiber optic cable, these may be strength members. The crimp ring 68 is then positioned over the outer jacket 72 and compressed or crimped over securing portion 60 as best shown in FIG. 6. Upon compression, the outer jacket 72 is prevented from moving rearward by the interaction of the crimp ring 68 and ridges 66 of the securing portion 60. The boot 76 is then slid over the crimp ring 68. It should be understood by those reasonably skilled in the art that single conductors can also be assembled to the crimp plug 68. Each of the single conductors could be assembled just as the conductors 74 of the cable 70 are assembled. In the case of single conductor assemblies however, a crimp ring 68 is not required. Instead, the boot 76 is applied directly to the securing portion 60 and held there by a frictional fit with the ridges 66.

Assembly of the cable 70 and crimp plug 10 to a connector 80 will be described with reference to FIG. 4. In this embodiment, the connector 80 is an optical connector, however it should be understood that it may be substituted by an electrical connector having electrical conductors instead of optical fibers. The crimp plug 10 is insertable into the connector 80 from a cable receiving end 82. The front portion is positioned within the connector 80 and is secured into the connector 80 by securing projections 26 which reside in openings 88. The crimp plug 10 also serves to compress the biasing spring 84 and urge a ferrule 86 toward a mating end 89. The fibers 78 have been previously terminated to the ferrule 86 by known techniques.

An advantage of the invention is that conductors 78 of the cable 70 may be assembled into the crimp plug 10 to exit the front end 22 having the desired length controlled by the stop shoulder 28, and having the desired position controlled by the conductor receiving passageways 64. An additional advantage is that positioning and length are controlled within a single assembly which also provides securing through the securing portion 40.

What is claimed is:

1. A crimp plug for use in a connector comprising;
   a front portion being insertable into the connector from a cable receiving end;
   a mid portion having a conductor receiving cavity for receiving a plurality of conductors;
   a stop shoulder disposed within the conductor receiving cavity of the mid portion; and
   a securing portion extending from the mid portion opposite the front portion, the securing portion having a plurality of conductor receiving passageways extending from an end to at least one conductor receiving cavity of the mid portion.

2. The crimping plug of claim 1 further comprising a stop shoulder disposed at an end of the conductor receiving cavity.

3. The crimp plug of claim 1 wherein the front portion further comprises a projection disposed on an outer surface.

4. The crimp plug of claim 1 wherein the securing portion further comprises a ridge extending substantially around an outer surface of the securing portion.

5. The crimp plug of claim 4 further comprising a crimp ring disposed around the securing portion.

6. A crimp plug for use in a connector comprising;
   a front portion being insertable into the connector from a cable receiving end;
   a mid portion having a conductor receiving cavity for receiving a plurality of conductors; and
   a securing portion extending from the mid portion opposite the front portion, the securing portion having a plurality of conductor receiving passageways extending from an end to at least one conductor receiving cavity of the mid portion; and
   a stop shoulder disposed between the conductor receiving passageways and the conductor receiving cavity.

7. The crimp plug of claim 6 wherein each conductor receiving passageway is profiled to receive a single conductor and the conductor receiving cavity is profiled to receive a plurality of conductors.

8. A crimp plug for use in a connector comprising;
   a front portion being insertable into the connector from a cable receiving end;
   a mid portion having a conductor receiving cavity for receiving a plurality of conductors;
   a securing portion extending from the mid portion opposite the front portion, the securing portion having a plurality of conductor receiving passageways extending from an end to at least one conductor receiving cavity of the mid portion; and
   a crimp ring disposed around the securing portion, wherein a cable jacket is received between the crimp ring and the securing portion.

9. A crimp plug for use in a connector comprising;
   a front portion being insertable into the connector from a cable receiving end;
   a mid portion having a conductor receiving cavity for receiving a plurality of conductors;
   a securing portion extending from the mid portion opposite the front portion, the securing portion having a plurality of conductor receiving passageways extending from an end to at least one conductor receiving-cavity of the mid portion; and
   a crimp ring disposed around the securing portion, wherein a strength member is received between the crimp ring and the securing portion.

10. An optical connector comprising:
    a housing having a cable receiving end for receiving a fiber from a cable;
    a crimp plug having a securing portion and a conductor receiving passageway for receiving a portion of the cable, a center portion extending from the securing portion, and a front portion extending from the center portion, wherein said front portion has a conductor receiving cavity having a plurality of semicircular passageways extending from a front end toward the center portion.

11. The optical connector of claim 10 wherein the portion of the cable received on the securing portion is a cable jacket.

12. The optical connector of claim 10 wherein the portion of the cable received on the securing portion is a strength member.

13. The optical connector of claim 10 wherein the front portion further comprises a projection disposed on an outer surface.

14. The optical connector of claim 10 further comprising a plurality of conductor receiving passageways each for receiving a respective buffered fiber.

15. The optical connector as set forth in claim 10, wherein the front portion further comprises at least one securing projection disposed on an outer surface.

16. The optical connector as set forth in claim 10, wherein said securing portion further comprises at least one ridge extending substantially around an outer surface of the securing portion.

17. The optical connector as set forth in claim 10, wherein said securing portion is profiled to receive a crimp ring over the portion of said cable.

18. A crimp plug for use in a connector comprising;
    a front portion being insertable into the connector from a cable receiving end, said front portion further comprising a plurality of semicircular passageways extending from a front end of said front portion toward the center portion;
    a mid portion having a conductor receiving cavity for receiving a plurality of conductors;
    a securing portion extending from the mid portion opposite the front portion, the securing portion having a plurality of conductor receiving passageways extending from an end to at least one conductor receiving cavity of the mid portion.

19. The optical connector of claim 18 wherein the conductor receiving cavity is profiled to receive a plurality of fibers from the conductor receiving passageway.

* * * * *